United States Patent
Chang

(10) Patent No.: US 10,205,657 B2
(45) Date of Patent: Feb. 12, 2019

(54) PACKET FORWARDING IN DATA CENTER NETWORK

(71) Applicant: Hewlett Packard Enterprise Development LP, Houston, TX (US)

(72) Inventor: Huifeng Chang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 52 days.

(21) Appl. No.: 15/031,522

(22) PCT Filed: Oct. 31, 2014

(86) PCT No.: PCT/CN2014/089959
§ 371 (c)(1),
(2) Date: Apr. 22, 2016

(87) PCT Pub. No.: WO2015/062529
PCT Pub. Date: May 7, 2015

(65) Prior Publication Data
US 2016/0261496 A1 Sep. 8, 2016

(30) Foreign Application Priority Data

Oct. 31, 2013 (CN) .......................... 2013 1 0534091

(51) Int. Cl.
*H04L 12/721* (2013.01)
*H04L 12/931* (2013.01)
(Continued)

(52) U.S. Cl.
CPC .......... *H04L 45/66* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,213,336 B2    7/2012   Smith et al.
8,892,706 B1 *  11/2014  Dalal .................. H04L 12/4641
                                                    709/223
(Continued)

FOREIGN PATENT DOCUMENTS

CN    103200069    7/2013
CN    103200085    7/2013

OTHER PUBLICATIONS

Mahalingam et al., "VXLAN: A Framework for Overlaying Virtualized Layer 2 Networks over Layer 3 Networks", draft-mahalingam-dutt-drops-vxlan-04.txt, Network Working Group, Internet Draft, May 8, 2013.

(Continued)

*Primary Examiner* — Candal Elpenord
(74) *Attorney, Agent, or Firm* — Mannava & Kang, P.C.

(57) ABSTRACT

The present disclosure provides a method and apparatus for forwarding a packet, wherein the method comprising: for each Virtual Machine (VM) in the server, obtaining relevant information of a virtual Network Interface Controller (vNIC) of the VM, and associating the obtained relevant information with a local virtual port, wherein the relevant information includes a Media Access Control (MAC) address of the vNIC, a Virtual eXtensible Local Area Network (VXLAN) Network Identifier (VNI) of the VXLAN where the vNIC is located, and a Virtual Local Area Network (VLAN) Identifier (ID) of a VLAN associated with the VXLAN where the vNIC is located; after receiving an Ethernet packet sent by the server, searching a VNI according to a source MAC address of the Ethernet packet and a VLAN ID; and according to the searched VNI, encapsulating the Ethernet packet, obtaining a VXLAN packet, and forwarding the VXLAN packet.

17 Claims, 10 Drawing Sheets

(51) Int. Cl.
*H04L 29/06* (2006.01)
*H04L 12/46* (2006.01)

(52) U.S. Cl.
CPC .......... *H04L 12/4675* (2013.01); *H04L 49/70* (2013.01); *H04L 69/22* (2013.01)

(56) References Cited

U.S. PATENT DOCUMENTS

| | | | |
|---|---|---|---|
| 9,143,582 B2* | 9/2015 | Banavalikar | H04L 69/03 |
| 2011/0317703 A1* | 12/2011 | Dunbar | H04L 12/462 |
| | | | 370/392 |
| 2012/0014386 A1* | 1/2012 | Xiong | H04L 29/12028 |
| | | | 370/392 |
| 2013/0034094 A1 | 2/2013 | Cardona et al. | |
| 2013/0089093 A1* | 4/2013 | Bacthu | H04L 12/4633 |
| | | | 370/390 |
| 2013/0215754 A1 | 8/2013 | Tripathi et al. | |
| 2013/0318219 A1 | 11/2013 | Kancherla | |
| 2014/0185616 A1* | 7/2014 | Bloch | G06F 9/45533 |
| | | | 370/392 |

OTHER PUBLICATIONS

"VXLAN Overlay Networks: Enabling Network Scalability for a Cloud Infrastructure", Emulex, Jul. 30, 2012.
English translation of "H3C Cloud Computing Overlay Network Based on Multiple Tenants", Oct. 15, 2013, p. 6, line 1 to p. 9, line 15., http://cloud.chinabyte.com/news/303/12745303.shtml.
International Search Report and Written Opinion dated Feb. 6, 2015, PCT Patent Application No. PCT/CN2014/089959 filed Oct. 31, 2014, State Intellectual Property Office of the P.R. China.
VXLAN Gateway Combining Virtual and Physical Network Functions, pp. 1-5 (Google Translation Sep. 21, 2018) Retrieved from the Internet for ISR/WO PCT/CN2014/089959, <sdxtdx.com/Newsdetail.asp?id=760VXLAN27>.

* cited by examiner

| Type: 7 bits | Length: 9 bits | Reason: 1 byte | VSI Type ID: 3 bytes | VSI Type Version: 1 byte | VSI ID Format: 1 byte | VSI ID: 16 bytes | Filter Format: 1 byte | Filter Info: n bytes |

FIG. 4

| Number of entries: 2 bytes | Group ID: 4 bytes | PS: 1 bit | PCP: 3 bits | VID: 12 bits |

←——repeat per entry——→

FIG. 5

| Number of entries: 2 bytes | Group ID: 4 bytes | MAC address: 6 bytes | PS: 1 bit | PCP: 3 bits | VID: 12 bits |

←——repeat per entry——→

FIG. 6

PACKET FORWARDING IN DATA CENTER NETWORK

CLAIM FOR PRIORITY

The present application is a national stage filing under 35 U.S.C. § 371 of PCT application number PCT/CN2014/089959, having an international filing date of Oct. 31, 2014, which claims priority to Chinese patent application number 201310534091.2, having a filing date of Oct. 31, 2013, the disclosures of which are hereby incorporated by reference in their entireties.

BACKGROUND

Virtual eXtensible Local Area Network (VXLAN) is a simple mechanism for encapsulating an Ethernet packet in User Data Protocol (UDP). VXLAN can establish a virtual two-layer sub-network across multiple physical Internet Protocol (IP) sub-networks. VXLAN can deploy millions of virtual networks within a data center through a tenant ID (i.e., VXLAN ID, or VXLAN Network Identifier (VNI), or VXLAN Segment ID) with 24 bits. In addition, it is much easy to implement a format of a VXLAN packet in hardware, hence it may be possible to integrate VXLAN with physical network devices more closely in the future.

BRIEF DESCRIPTION OF THE DRAWINGS

FIG. 4 is a schematic diagram illustrating a format of Type Length Value (TLV) in a Virtual Station Interface (VSI) Discovery and configuration Protocol (VDP) packet according to a first example of the present disclosure.

FIG. 5 is a schematic diagram illustrating a format of Filter Info domain when the value of Filter Format domain in FIG. 4 is 0x03 according to a first example of the present disclosure.

FIG. 6 is a schematic diagram illustrating a format of Filter Info domain when the value of Filter Format domain in FIG. 4 is 0x04 according to a first example of the present disclosure.

DETAILED DESCRIPTION

In order to solve the problem of low forwarding efficiency caused by using a virtual Switch (vSwitch) as an VXLAN Tunnel End Point (VTEP) implemented by a software in the prior art, the following examples provide a method for forwarding a packet in a data center network and an apparatus for applying the method.

Figure 1:
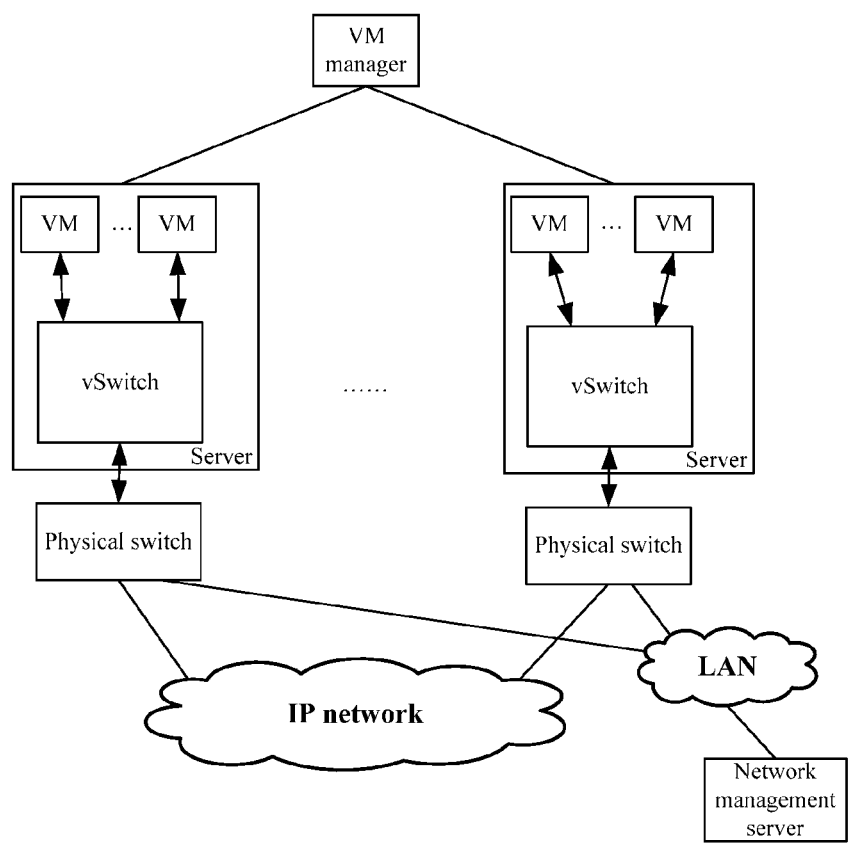
FIG. 1 is a schematic diagram illustrating a network including a data center network, a Virtual Machine (VM) management center and a network management server according to a first example of the present disclosure.

In examples of the present disclosure, as shown in FIG. 1, a data center network includes at least one server, a vSwitch and a VM configured in the server, a physical switch outside of the server and connected with a VM via a vSwitch. The server may be a direct connect server which is directly connected with the physical switch. An overlay function (i.e., a two-layer packet carried over a three-layer network) is enabled in the physical switch. For example, the overlay may be VXLAN, or Network Virtualization using Generic Routing Encapsulation (NVGRE), etc.

In the following examples, a VXLAN function is enabled in the physical switch, and the physical switch works as a VTEP. A vNIC in VM connected with a vSwitch may also be called as a VSI.

Example 1

Figure 2:
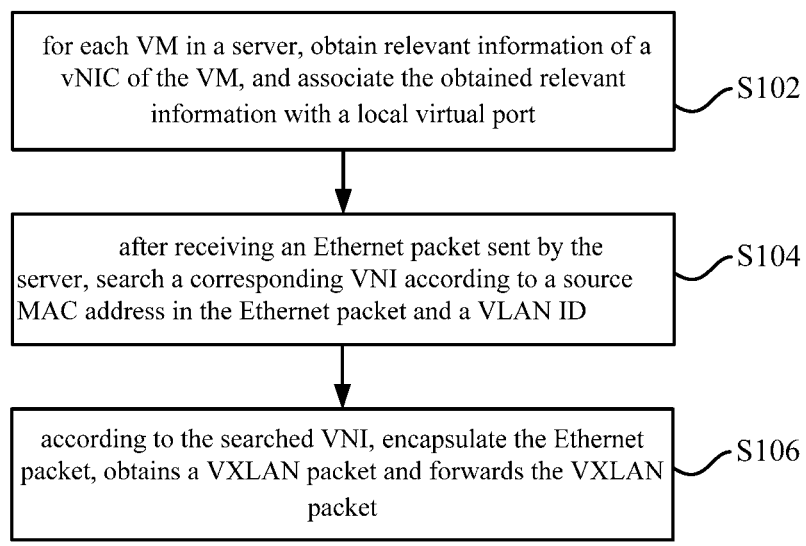
FIG. 2 is a flow diagram illustrating a method for forwarding a packet in a data center network according to a first example of the present disclosure.

The method for forwarding a pack described in examples of the present disclosure is performed by the physical switch in the data center network as shown in FIG. 1. FIG. 2 is a flow diagram illustrating a method for forwarding a packet in a data center network according to a first example of the present disclosure. As shown in FIG. 2, the method includes the following procedures.

At block S102, for each VM in a server, obtain relevant information of a vNIC of the VM, and associate the obtained relevant information with a local virtual port.

The relevant information includes a MAC address of the vNIC, a VNI of the VXLAN where the vNIC is located, and a Virtual Local Area Network (VLAN) ID of a VLAN associated with the VXLAN where the vNIC is located.

At block S104, after receiving an Ethernet packet sent by the server, search a corresponding VNI according to a source MAC address in the Ethernet packet and a VLAN ID.

In particular, after a VM in the server sends a data packet, a directly connected vSwitch receives the data packet, and encapsulates the data packet as an Ethernet packet, then sends it to the directly connected physical switch.

At block S106, according to the searched VNI, encapsulate the Ethernet packet, obtain a VXLAN packet and forward the VXLAN packet. The specific way of encapsulating may follow the prior art, which is not described in detail herein.

In implementation, there are some ways to obtain relevant information of a vNIC. The following are four examples for illustration.

Figure 3:
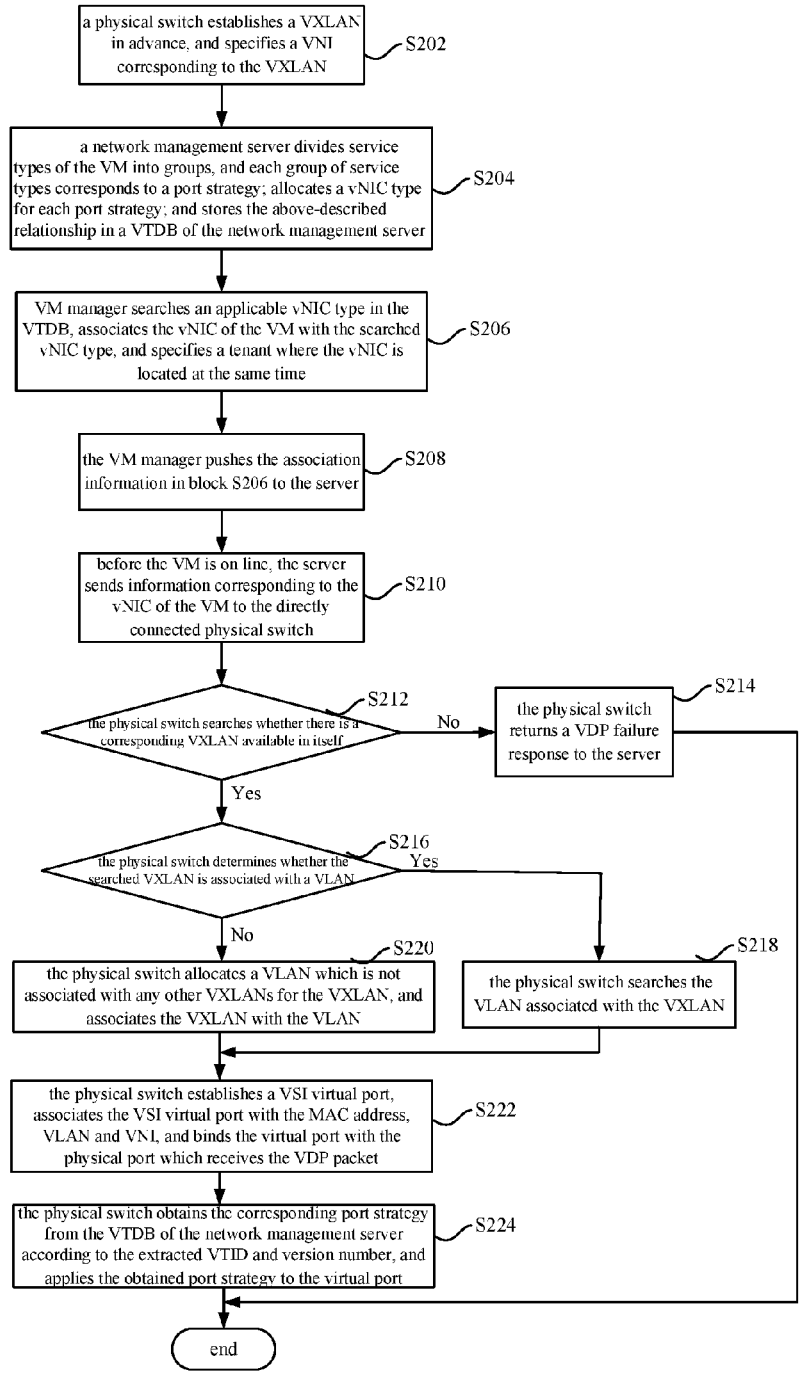
FIG. 3 is a flow diagram illustrating a method for obtaining relevant information of a virtual Network Interface Controller (vNIC) according to a first example of the present disclosure.

FIG. 3 is a flow diagram illustrating a method for obtaining relevant information of a vNIC according to a first example of the present disclosure. The method includes the following procedures.

In block S202, a physical switch establishes a VXLAN in advance, and specifies a VNI corresponding to the VXLAN.

In block S204, a network management server divides service types of the VM into groups, and each group of service types corresponds to a port strategy; allocates a vNIC type for each port strategy, and each vNIC type has a vNIC Type Identifier (VTID) and a version number; and stores the above-described relationship in a vNIC Type DataBase (VTDB) of the network management server, i.e., stores the corresponding relationship among the service type group, the port strategy and the vNIC type to the VTDB.

Service types of the VM may include webserver, database, e-mail, etc.

The port strategy may include some port behavior, e.g., restricting the speed, allowing a data flow to pass the VLAN, etc.

In block S206, by communication with the network management server, a VM manager (also called as a VM management apparatus) searches an applicable vNIC type in the VTDB, associates the vNIC of the VM with the searched vNIC type, and specifies a tenant where the vNIC is located at the same time, i.e., specifies the VXLAN where the vNIC is located.

In particular, associating the vNIC of the VM with the searched vNIC type includes, associating the MAC address of the vNIC with the VTID and the version number of the vNIC type; or, associating other information for uniquely identifying the vNIC with the VTID and the version number of the vNIC type.

In block S208, the VM manager pushes the association information in block S206 to the server, i.e., pushes the association relationship among the vNIC of the VM, the vNIC type (in particular, the VTID and the version number), and the VXLAN where the vNIC is located (in particular, the VNI) to the server.

In block S210, before the VM is on line, the server sends information corresponding to the vNIC of the VM to the directly connected physical switch. The information includes the MAC address of the vNIC and the VNI of the VXLAN where the vNIC is located. Furthermore, it may also include the VTID and the version number of the vNIC type associated with the vNIC.

Specifically, the server may carry the above-described information through a VDP packet. As shown in FIG. 4, a TLV of the VDP packet may include a Type domain, a Length domain, a Reason domain, a VSI Type ID domain, a VSI ID Format domain, a VSI ID domain, a Filter Format domain, and a Filter Info domain.

Besides the Filter Format domain and the Filter Info domain, values and meaning of other domains may be same with the prior art, which is not described in detail herein. The following will describe the Filter Format domain and the Filter Info domain.

(1) Filter Format Domain

Values of the Filter Format domain are shown in Table 1.

TABLE 1

Values and meaning of Filter Format domain

| Value | Meaning |
| --- | --- |
| 0x01 | VLAN (C-VLAN) |
| 0x02 | MAC + VLAN |
| 0x03 | Group ID + VLAN |
| 0x04 | Group ID + MAC + VLAN |
| Others | undefined |

(2) Filter Info Domain

Content carried in the Filter Info domain is related with values of the Filter Format domain. For example, when the value of Filter Format domain is 0x03 or 0x04, a Group ID may be carried in the Filter Info domain. When the value of Filter Format domain is 0x03, the format of the Filter Info domain is shown in FIG. 5. When the value of Filter Format domain is 0x04, the format of the Filter Info domain is shown in FIG. 6.

In the example, a VNI may be carried in the Group ID field of FIG. 5 or FIG. 6. Because the Group ID field uses 4 bytes, in implementation, it may set a first high byte of those 4 bytes to be 0, and three low bytes to be a VNI (24 bits).

Hence, in block S210, it may use the Filter Info domain to send the MAC address of the vNIC of the VM and the VNI of the VXLAN where the vNIC of the VM is located to the physical switch. In addition, because there is a VLAN domain in the Filter Info domain, it may fill an invalid VLAN ID when sending, e.g., VLAN 0 or VLAN 4095.

In block S212, after a VDP packet is received, the physical switch extracts the MAC address, VNI, VTID and the version number, and then searches whether there is a corresponding VXLAN available in itself according to the extracted VNI (i.e., whether the corresponding VXLAN is already established).

If no, perform block S214; if yes, perform block S216.

In block S214, the physical switch returns a VDP failure response to the server, and the procedure ends.

In block S216, the physical switch determines whether the searched VXLAN is associated with a VLAN. If yes, perform block S218; if no, perform block S220.

In block S218, when the VXLAN is already associated with a VLAN, the physical switch searches the VLAN associated with the VXLAN, and then perform block S222.

In block S220, when the VXLAN is not associated with a VLAN, the physical switch allocates a VLAN which is not associated with any other VXLANs for the VXLAN, and associates the VXLAN with the VLAN.

In block S222, the physical switch establishes a VSI virtual port (also called as a local virtual port) to correspond to the VM or the vNIC of the VM, associates the VSI virtual port with the MAC address, VLAN and VNI, and binds the VSI virtual port with the physical port which receives the VDP packet.

In block S224, the physical switch obtains the corresponding port strategy from the VTDB of the network management server according to the extracted VTID and version number, and applies the obtained port strategy to the VSI virtual port.

Applying the obtained port strategy to the VSI virtual port includes, for example, associating the port strategy with the VSI virtual port.

In addition, on the contrary, before the VM is off line, the server may also perform block S210 to send a VDP packet to the physical switch. After receiving the VDP packet, the physical switch extracts the MAC address and VNI from the VDP packet, searches a corresponding VSI virtual port locally according to the extracted MAC address and VNI, deletes the searched VSI virtual port, and associates the VSI virtual port with its corresponding information.

Figure 7:
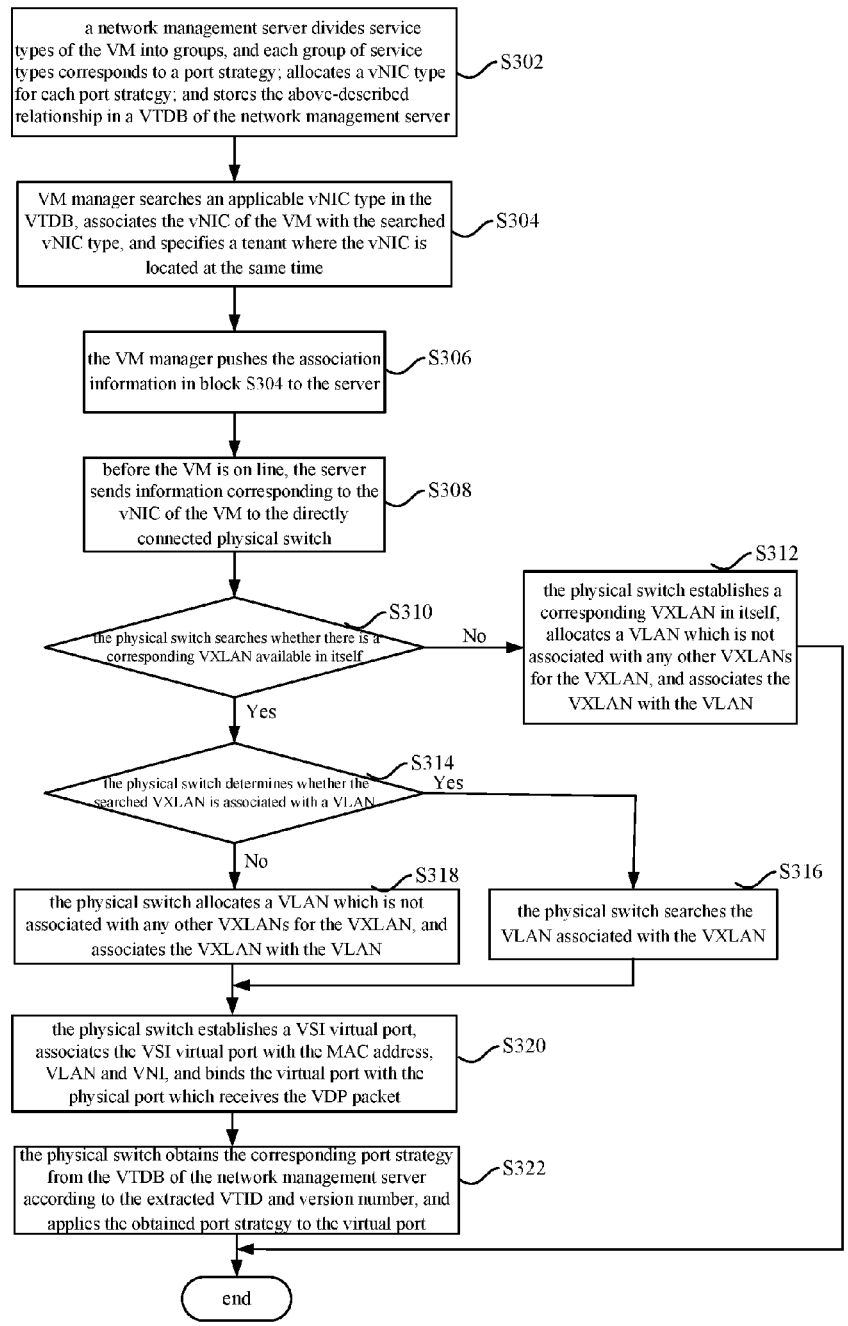
FIG. 7 is a flow diagram illustrating a method for obtaining relevant information of a vNIC according to an example of the present disclosure.

FIG. 7 is a flow diagram illustrating a method for obtaining relevant information of a vNIC according to an example of the present disclosure. The method includes the following procedures.

In block S302, the network management server divides service types of the VM into groups, and each group of service types corresponds to a port strategy; allocates a vNIC type for each port strategy, and each vNIC type has a VTID and a version number; and stores the above-described relationship in a VTDB of the network management server, i.e., stores the corresponding relationship among the service type group, the port strategy and the vNIC type to the VTDB.

Service types of the VM may include webserver, database, e-mail, etc.

The port strategy may include some port behavior, e.g., restricting the speed, allowing a data flow to pass the VLAN, etc.

In block S304, by communication with the network management server, a VM manager (also called as a VM management apparatus) searches an applicable vNIC type in the VTDB, associates the vNIC of the VM with the searched vNIC type, and specifies a tenant where the vNIC is located at the same time, i.e., specifies the VXLAN where the vNIC is located.

In particular, associating the vNIC of the VM with the searched vNIC type includes, associating the MAC address of the vNIC with the VTID and the version number of the vNIC type; or, associating other information for uniquely identifying the vNIC with the VTID and the version number of the vNIC type.

In block S306, the VM manager pushes the association information in block S304 to the server, i.e., pushes the association relationship among the vNIC of the VM, the vNIC type (in particular, the VTID and the version number), and the VXLAN where the vNIC is located (in particular, the VNI) to the server.

In block S308, before the VM is on line, the server sends information corresponding to the vNIC of the VM to the directly connected physical switch. The information includes the MAC address of the vNIC and the VNI of the VXLAN where the vNIC is located. Furthermore, it may also include the VTID and the version number of the vNIC type associated with the vNIC.

Specifically, the server may carry the above-described information through a VDP packet.

In block S310, after a VDP packet is received, the physical switch extracts the MAC address, VNI, VTID and the version number, and then searches whether there is a corresponding VXLAN available in the physical switch according to the extracted VNI (i.e., whether the corresponding VXLAN is already established).

If no, perform block S312; if yes, perform block S314.

In block S312, the physical switch establishes a corresponding VXLAN in itself, allocates a VLAN which is not associated with any other VXLANs for the VXLAN, and associates the VXLAN with the VLAN.

In block S314, the physical switch determines whether the searched VXLAN is associated with a VLAN. If yes, perform block S316; if no, perform block S318.

In block S316, when the VXLAN is already associated with a VLAN, search the VLAN associated with the VXLAN, and then perform block S320.

In block S318, when the VXLAN is not associated with a VLAN, allocate a VLAN which is not associated with any other VXLANs for the VXLAN, and associate the VXLAN with the VLAN.

In block S320, the physical switch establishes a VSI virtual port (also called as a local virtual port) to correspond to the VM or the vNIC of the VM, associates the VSI virtual port with the MAC address, VLAN and VNI, and binds the VSI virtual port with the physical port which receives the VDP packet.

In block S322, the physical switch obtains the corresponding port strategy from the VTDB of the network management server according to the extracted VTID and version number, and applies the obtained port strategy to the VSI virtual port.

Applying the obtained port strategy to the VSI virtual port includes, for example, associating the port strategy with the VSI virtual port.

In addition, on the contrary, before the VM is off line, the operations are same with those in the above-described example, which are not described in detail herein.

Compared with the above-described example, in this example, the physical switch may not establish a VXLAN in advance, and automatically establish based on needs in block S312.

Figure 8:
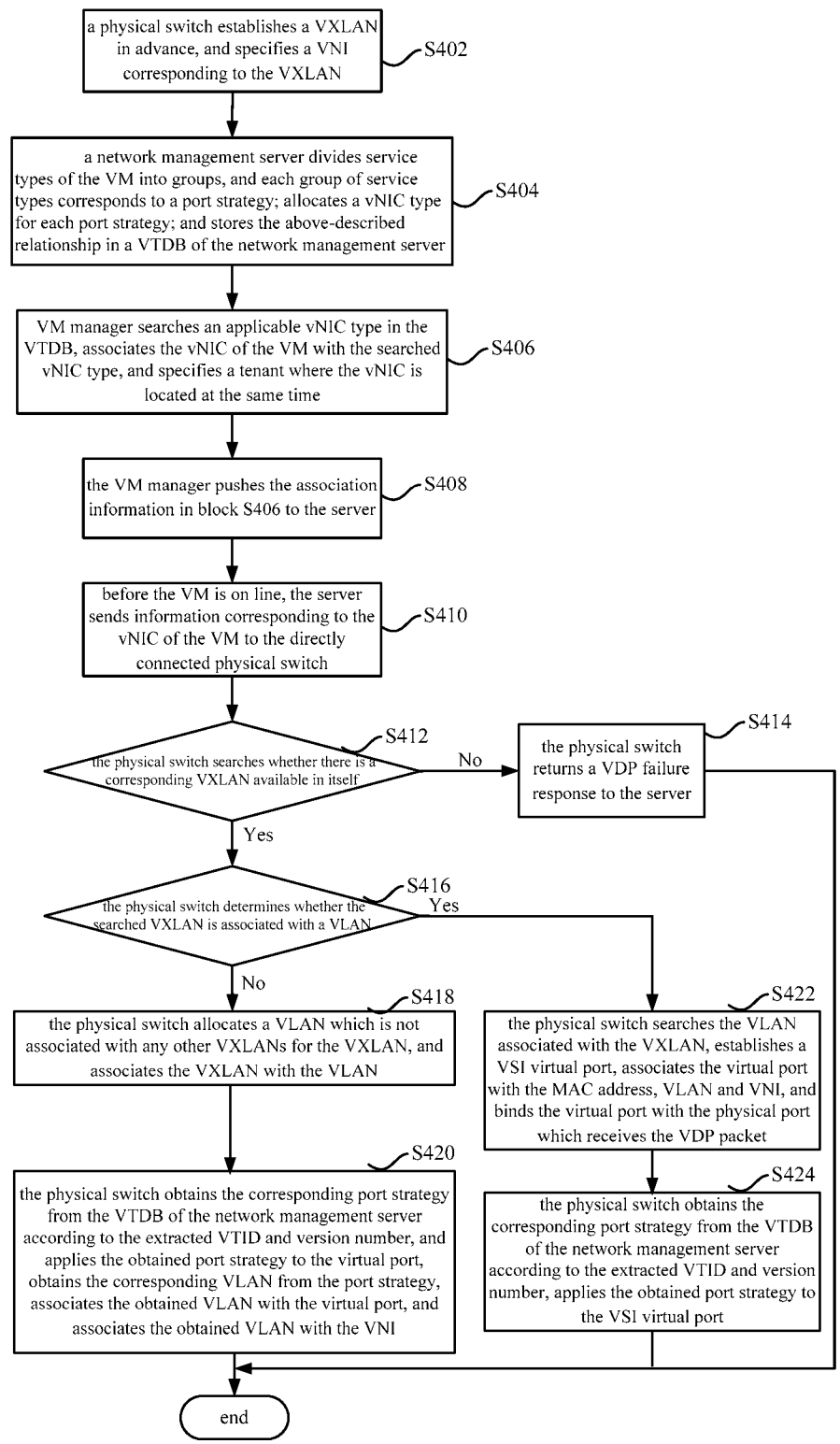
FIG. 8 is a flow diagram illustrating a method for obtaining relevant information of a vNIC according to another example of the present disclosure.

FIG. 8 is a flow diagram illustrating a method for obtaining relevant information of a vNIC according to another example of the present disclosure. As shown in FIG. 8, the method includes the following procedures.

In block S402, a physical switch establishes a VXLAN in advance, and specifies a VNI corresponding to the VXLAN.

In block S404, a network management server divides service types of the VM into groups, and each group of service types corresponds to a port strategy; allocates a vNIC type for each port strategy, and each vNIC type has a VTID and a version number; and stores the above-described relationship in a VTDB of the network management server, i.e., stores the corresponding relationship among the service type group, the port strategy and the vNIC type to the VTDB.

Service types of the VM may include webserver, database, e-mail, etc.

The port strategy may include some port behavior, e.g., restricting the speed, allowing a data flow to pass the VLAN, etc.

In block S406, by communication with the network management server, a VM manager (also called as a VM management apparatus) searches an applicable vNIC type in the VTDB, associates the vNIC of the VM with the searched vNIC type, and specifies a tenant where the vNIC is located at the same time, i.e., specifies the VXLAN where the vNIC is located.

In particular, associating the vNIC of the VM with the searched vNIC type includes, associating the MAC address of the vNIC with the VTID and the version number of the vNIC type; or, associating other information for uniquely identifying the vNIC with the VTID and the version number of the vNIC type.

In block S408, the VM manager pushes the association information in block S406 to the server, i.e., pushes the association relationship among the vNIC of the VM, the vNIC type (in particular, the VTID and the version number), and the VXLAN where the vNIC is located (in particular, the VNI) to the server.

In block S410, before the VM is on line, the server sends information corresponding to the vNIC of the VM to the directly connected physical switch. The information includes the MAC address of the vNIC and the VNI of the VXLAN where the vNIC is located. Furthermore, it may also include the VTID and the version number of the vNIC type associated with the vNIC.

Specifically, the server may carry the above-described information through a VDP packet.

In block S412, after a VDP packet is received, the physical switch extracts the MAC address, VNI, VTID and the version number, and then searches whether there is a corresponding VXLAN available in the physical switch according to the extracted VNI (i.e., whether the corresponding VXLAN is already established).

If no, perform block S414; if yes, perform block S416.

In block S414, the physical switch returns a VDP failure response to the server, and the procedure ends.

In block S416, the physical switch determines whether the searched VXLAN is associated with a VLAN. If yes, perform block S418; if no, perform block S422.

In block S418, the physical switch establishes a VSI virtual port to correspond to the VM or the vNIC of the VM, associates the VSI virtual port with the MAC address and VNI (i.e., the VNI of the VXLAN), and binds the VSI virtual port with the physical port which receives the VDP packet; then performs block S420.

In block S420, the physical switch obtains the corresponding port strategy from the VTDB of the network management server according to the extracted VTID and version number, applies the obtained port strategy to the VSI virtual port, obtains the corresponding VLAN from the port strategy, associates the obtained VLAN with the virtual port, and associates the obtained VLAN with the VNI.

For example, the port strategy may include allowing the data flow to pass a VLAN, and such VLAN is the corresponding VLAN in the port strategy.

In block S422, the physical switch searches the VLAN associated with the VXLAN, establishes a VSI virtual port to correspond to the VM or the vNIC of the VM, associates the VSI virtual port with the MAC address, VLAN and VNI, and binds the VSI virtual port with the physical port which receives the VDP packet; then performs block S424.

In block S424, the physical switch obtains the corresponding port strategy from the VTDB of the network management server according to the extracted VTID and version number, applies the obtained port strategy to the VSI virtual port.

Or, in this example, block S402 may not be performed, such that in block S414, the physical switch may establish a corresponding VXLAN (the newly established VXLAN is not associated with any VLANs); then perform block S418.

In addition, on the contrary, before the VM is off line, the operations are same with those in the above-described examples, which are not described in detail herein.

Compared with the above-described two examples, in this example, when it is determined that the searched VXLAN is not associated with a VLAN in block S416, it may not allocate a VLAN for the VXLAN and associate them in block S418. But rather, in block S420, obtain the corresponding port strategy and the corresponding VLAN from the port strategy, and associates the VLAN with the virtual port and the VXLAN.

Figure 9:
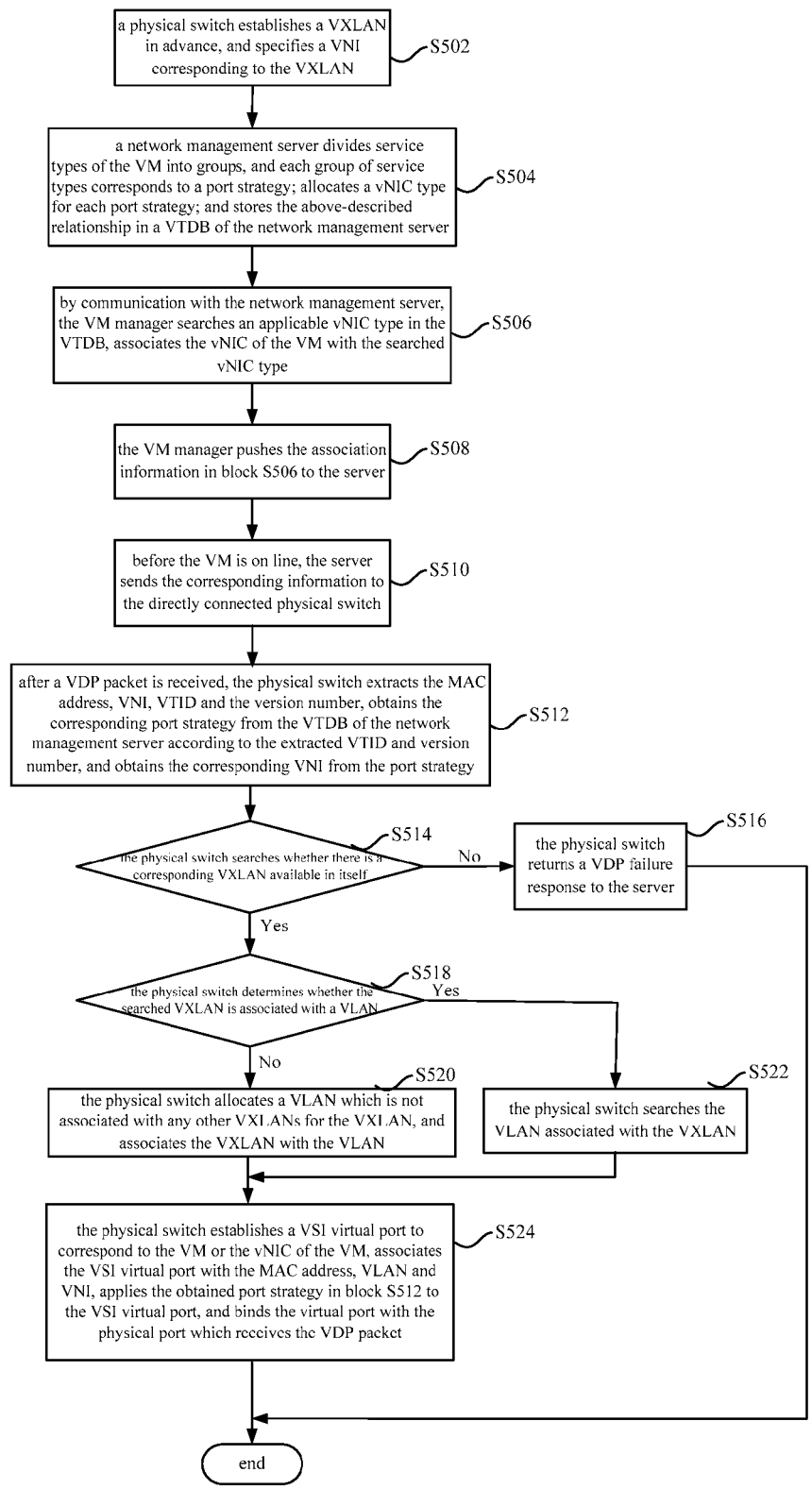
FIG. 9 is a flow diagram illustrating a method for obtaining relevant information of a vNIC according to yet another example of the present disclosure.

FIG. 9 is a flow diagram illustrating a method for obtaining relevant information of a vNIC according to yet another example of the present disclosure. As shown in FIG. 9, the method includes the following procedures.

In block S502, a physical switch establishes a VXLAN in advance, and specifies a VNI corresponding to the VXLAN.

In block S504, a network management server divides service types of the VM into groups, and each group of service types corresponds to a port strategy; allocates a vNIC type for each port strategy, and each vNIC type has a VTID and a version number; and stores the above-described relationship in a VTDB of the network management server, i.e., stores the corresponding relationship among the service type group, the port strategy and the vNIC type to the VTDB.

The port strategy may include some port behavior, e.g., restricting the speed, allowing a data flow to pass the VLAN, etc.

In block S506, by communication with the network management server, a VM manager (also called as a VM management apparatus) searches an applicable vNIC type in the VTDB, and associates the vNIC of the VM with the searched vNIC type.

In block S508, the VM manager pushes the association information in block S506 to the server, i.e., pushes the association relationship between the vNIC of the VM and the vNIC type to the server.

In block S510, before the VM is on line, the server sends information corresponding to the VM to the directly connected physical switch. The information includes the MAC address of the vNIC. Furthermore, it may also include the VTID and the version number of the vNIC type associated with the VM.

In block S512, after a VDP packet is received, the physical switch extracts the MAC address, VNI, VTID and the version number, obtains the corresponding port strategy from the VTDB of the network management server according to the extracted VTID and version number, and obtains the corresponding VNI from the port strategy.

In block S514, according to the extracted VNI obtained in block S512, the physical switch searches whether there is a corresponding VXLAN available in the physical switch (i.e., whether the corresponding VXLAN is already established).

If no, perform block S516; if yes, perform block S518.

In block S516, the physical switch returns a VDP failure response to the server, and the procedure ends.

In block S518, the physical switch determines whether the searched VXLAN is associated with a VLAN. If yes, perform block S522; if no, perform block S520.

In block S520, the physical switch allocates a VLAN which is not associated with any other VXLANs for the VXLAN, and associate the VXLAN with the VLAN; then perform block S524.

In block S522, the physical switch searches the VLAN associated with the VXLAN, and then perform block S524.

In block S524, the physical switch establishes a VSI virtual port to correspond to the VM or the vNIC of the VM, associates the VSI virtual port with the MAC address, VLAN and VNI, applies the obtained port strategy in block S512 to the VSI virtual port, and binds the VSI virtual port with the physical port which receives the VDP packet.

Or, in this example, block S502 may not be performed, such that in block S516, the physical switch may establish a corresponding VXLAN, allocate a VLAN which is not associated with any other VXLANs for the VXLAN, and associate the VXLAN with the VLAN; then perform block S524.

In addition, on the contrary, before the VM is off line, the server may also perform block S510 to send a VDP packet to the physical switch, and the physical switch may perform block S512 to obtain the corresponding MAC address and VNI, search a corresponding VSI virtual port locally, deletes the searched VSI virtual port, and associates the VSI virtual port with its corresponding information.

Compared with the above-described examples, in this example, the VM manager may not specify a VNI for the vNIC of the VM. Then, in block S512, after a VDP packet is received, the physical switch obtains the corresponding port strategy from the VTDB of the network management server according to the extracted VTID and version number, and obtains the corresponding VNI from the port strategy.

In implementation, any two examples of the above-described four examples can be combined for obtaining relevant information of a vNIC.

Example 2

Figure 10:
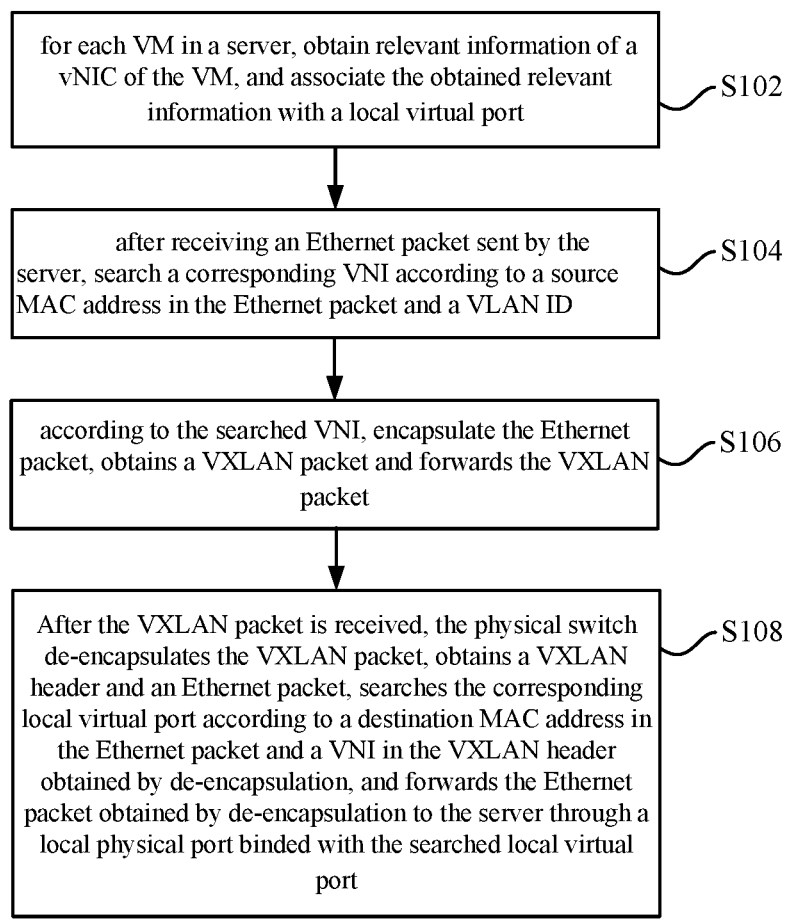
FIG. 10 is a flow diagram illustrating a method for forwarding a packet in a data center network according to a second example of the present disclosure.

FIG. 10 is a flow diagram illustrating a method for forwarding a packet in a data center network according to a second example of the present disclosure. Besides the block S102, S104 and S106 as described in the first example, the method also includes S108.

Specifically, at block S108, for the VXLAN packet received from the IP network, the physical switch may also perform the following operations. After the VXLAN packet is received, the physical switch de-encapsulates the VXLAN packet, obtains a VXLAN header and an Ethernet packet, searches the corresponding local virtual port according to a destination MAC address in the Ethernet packet and a VNI in the VXLAN header obtained by de-encapsulation, and forwards the Ethernet packet obtained by de-encapsulation to the server through a local physical port binded with the searched local virtual port.

After the Ethernet packet is received, the vSwitch in the server may search matched flow table entries locally, and forward the data packet obtained by de-encapsulating the Ethernet packet to a destination VM according to the table entries.

According to the above-described examples in the present disclosure, the physical switch obtains relevant information of a vNIC of each VM in the server, and associates the obtained relevant information with a local virtual port. Then, after receiving an Ethernet packet sent by the server, according to a source MAC address in the Ethernet packet and VLAN, the physical switch identifies the corresponding local virtual port and searches a corresponding VNI. At last, according to the searched VNI, the physical switch encapsulates the Ethernet packet as a VXLAN packet and forwards the VXLAN packet by mapping the VLAN data flow into the VXLAN. In the present disclosure, an overlay technology, e.g., VXLAN, is initiated in the physical switch, and the physical switch works as a VTEP. Because the physical switch uses hardware for forwarding, the forwarding efficiency is higher than the vSwitch implemented by software. Further, the VXLAN data flow is not only visible in the physical switch, but also operated between the physical switch and the server. In the service plane, only the VXLAN is visible for the user. By dividing a tenant according to the VXLAN, the VLAN is invisible for the user. VLAN works as a local service dividing tool, and a VLAN tag is automatically allocated by the system, so the VLAN is invisible for the final user.

Figure 11:
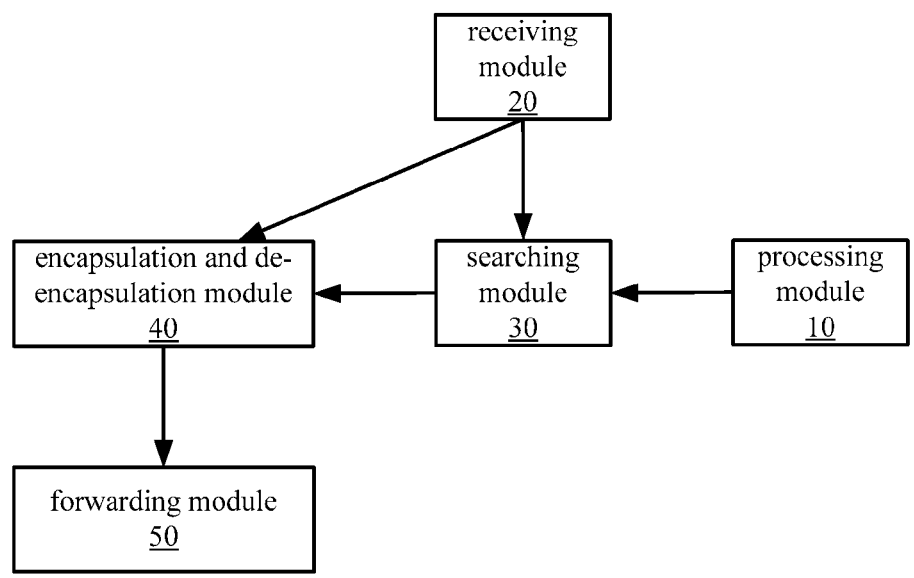
FIG. 11 is a schematic diagram illustrating a structure of an apparatus for forwarding a packet in a data center network according to a second example of the present disclosure.

According to the method described in the first example, the present disclosure provides an apparatus for applying the method for forwarding a packet. The apparatus for forwarding a packet is applied in the physical switch. As shown in FIG. 11, the apparatus for forwarding a packet includes a processing module 10, a receiving module 20, a searching module 30, an encapsulation and de-encapsulation module 40 and a forwarding module 50.

The processing module 10 is configured to, for each VM in the server of the physical switch, obtain relevant information of a vNIC of the VM, and associate the obtained relevant information with a local virtual port. The relevant information includes a MAC address of the vNIC, a VNI of the VXLAN where the vNIC is located, and a VLAN ID of a VLAN associated with the VXLAN where the vNIC is located.

The receiving module 20 is configured to receive an Ethernet packet sent by the server.

The searching module 30 is configured to, after an Ethernet packet is received from the server in the receiving module 20, search a corresponding VNI according to a source MAC address in the Ethernet packet and a VLAN ID.

The encapsulation and de-encapsulation module 40 is configured to, according to the VNI searched in the searching module 30, encapsulate the Ethernet packet received in the receiving module 20 and obtain a VXLAN packet.

The forwarding module 50 is configured to, forward the VXLAN packet encapsulated in the encapsulation and de-encapsulation module 40.

In addition, the apparatus may also include a storage module, configured to store the local virtual port and relevant information of the associated vNIC.

The receiving module is further configured to receive a VXLAN packet.

The encapsulation and de-encapsulation module is further configured to, after the VXLAN packet is received in the receiving module, de-encapsulate the VXLAN packet, and obtain a VXLAN header and an Ethernet packet.

The searching module is further configured to search the corresponding local virtual port according to a destination MAC address in the Ethernet packet and a VNI in the VXLAN header de-encapsulated in the encapsulation and de-encapsulation module.

The forwarding module is further configured to forward the Ethernet packet de-encapsulated in the encapsulation and de-encapsulation module to the server through a local physical port binded with the local virtual port searched in the searching module.

The processing module includes a MAC receiving unit, a first obtaining unit and a second obtaining unit.

The MAC receiving unit is configured to receive a MAC address of the vNIC sent by the server.

The first obtaining unit is configured to obtain a VNI of the VXLAN where the vNIC is located.

The second obtaining unit is configured to obtain a VLAN ID of a VLAN associated with the VXLAN where the vNIC is located.

Specifically, the first obtaining unit is configured to receive the VNI of the VXLAN where the vNIC is located sent by the server, where the VNI is sent to the server after the VM manager specifies the VXLAN for the vNIC; or after receiving the vNIC type associated with the vNIC sent by the server, obtain the corresponding port strategy from the network management server according to the vNIC type, and obtain a VNI from the port strategy as the VNI of the VXLAN where the vNIC is located, where the vNIC type associated with the vNIC is sent to the server after the VM manager specifies the associated VNIC type for the vNIC.

Specifically, the second obtaining unit is configured to, after the VNI of the VXLAN where the vNIC is located is obtained in the first obtaining unit, search whether there is a corresponding VXLAN available in the physical switch according to the obtained VNI; if yes, when the searched VXLAN is not associated with a VLAN, allocate a VLAN which is not associated with any other VXLANs for the searched VXLAN, and associate the searched VXLAN with the allocated VLAN; when the searched VXLAN is already associated with a VLAN, search the VLAN associated with the VXLAN; or after receiving the vNIC type associated with the vNIC sent by the server, obtain the corresponding port strategy from the network management server according to the vNIC type, and obtain a VNI from the port strategy as the VNI of the VXLAN where the vNIC is located.

The apparatus may further includes an establishing module, configured to establish a VXLAN in the physical switch in advance, and allocate a VNI for the VXLAN. Thus, the second obtaining unit is further configured to, after searching whether there is a corresponding VXLAN available in the physical switch according to the obtained VNI, if it is no, end the procedure; or after searching whether there is a corresponding VXLAN available in the physical switch according to the obtained VNI, if it is no, establish a VXLAN identified by the obtained VNI in the physical switch, allocate a VLAN which is not associated with any other VXLANs for the VXLAN, and associate the VXLAN and the VLAN.

Example 3

The third example of the present disclosure provides a hardware structure of a device for forwarding a packet.

Figure 12:
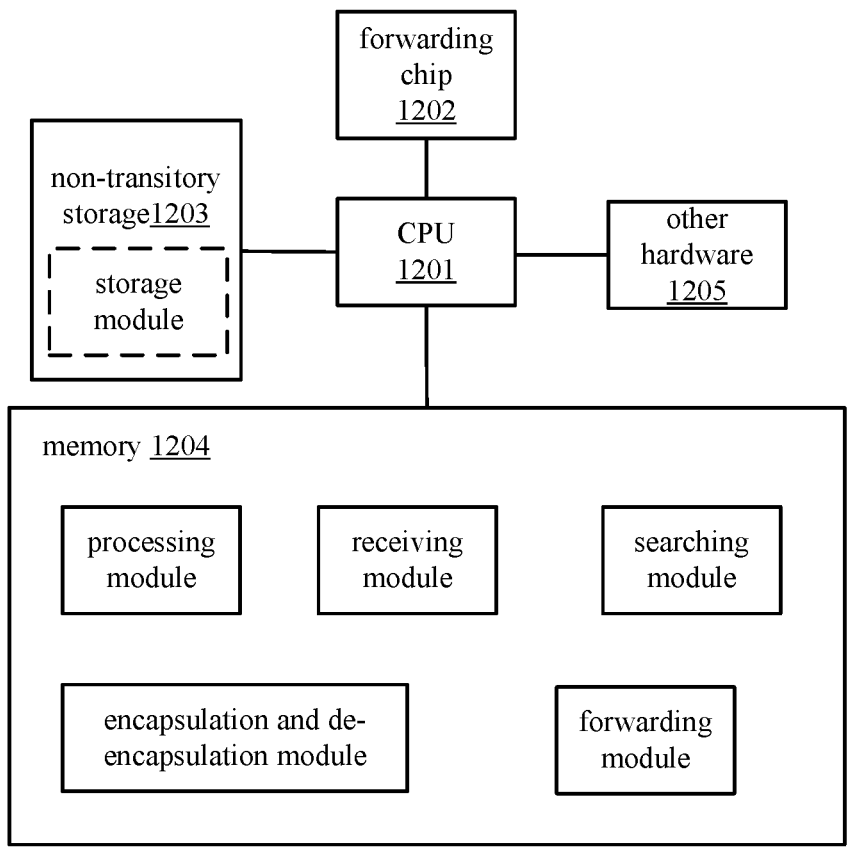
FIG. 12 is a schematic diagram illustrating a hardware structure of a device for forwarding a packet in a data center network according to a third example of the present disclosure.

The device for forwarding a packet may be a programmable device with a combined software and hardware. FIG. 12 is a schematic diagram illustrating a hardware structure of a device for forwarding a packet in a data center network according to a third example of the present disclosure. As shown in FIG. 12, the device for forwarding a packet includes a processor, e.g., a Central Process Unit (CPU) 1201, a forwarding chip 1202, a storage, including a non-transitory storage 1203 and a memory 1204, and other hardware 1205.

The memory 1204 is configured to store instructions. The operations performed when the instructions are executed include the functions performed by the processing module, the receiving module, the searching module, the encapsulation and de-encapsulation module, the forwarding module and the establishing module in the apparatus for forwarding a packet, which are not described in detail herein.

The CPU 1201 is configured to communicate with the forwarding chip 1202, forward and receive packets, including: receiving an Ethernet packet sent by the server of the physical switch, forwarding the VXLAN packet obtained by encapsulation, receiving a VXLAN packet, and forwarding the Ethernet packet obtained by de-encapsulation to the server of the physical switch; configured to communicate with the memory 1204, read and execute the instructions stored in the memory 1204, to perform functions of the processing module, the receiving module, the searching module, the encapsulation and de-encapsulation module, the forwarding module and the establishing module in the above-described apparatus for forwarding a packet, and process the packet forwarded by the forwarding chip 1202; and configured to communicate with the non-transitory storage 1203, read/write the data in the non-transitory storage 1203, including the local virtual port and relevant information of the associated vNIC.

The processing module is configured to, for each VM in the server of the physical switch, obtain relevant information of a vNIC of the VM, and associate the obtained relevant information with a local virtual port, and store them in the non-transitory storage 1203. The relevant information includes a MAC address of the vNIC, a VNI of the VXLAN where the vNIC is located, and a VLAN ID of a VLAN associated with the VXLAN where the vNIC is located. The receiving module is configured to receive an Ethernet packet sent by the server. The searching module is configured to, after an Ethernet packet is received from the server in the receiving module, search a corresponding VNI from the non-transitory storage 1203 according to a source MAC address in the Ethernet packet and a VLAN ID. The encapsulation and de-encapsulation module is configured to, according to the VNI searched in the searching module, encapsulate the Ethernet packet received in the receiving module and obtain a VXLAN packet. The forwarding module is configured to forward the encapsulated VXLAN packet.

The receiving module is further configured to receive a VXLAN packet. The encapsulation and de-encapsulation module is further configured to, after the VXLAN packet is received in the receiving module, de-encapsulate the VXLAN packet, and obtain a VXLAN header and an Ethernet packet. The searching module is further configured to search the corresponding local virtual port from the non-transitory storage 1203 according to a destination MAC address in the Ethernet packet and a VNI in the VXLAN header de-encapsulated in the encapsulation and de-encapsulation module. The forwarding module is further configured to forward the Ethernet packet de-encapsulated in the encapsulation and de-encapsulation module to the server through a local physical port binded with the local virtual port searched in the searching module.

The forwarding chip 1202 is configured to connect with the physical switch, the server and the IP network through ports in the chip, and be responsible for forwarding and receiving the above-described packets. In particular, the forwarding chip forwards the Ethernet packet from the server to the CPU 1201, forwards the VXLAN packet from the CPU 1201 to the IP network, forwards the VXLAN packet from the IP network to the CPU 1201, and forwards the Ethernet packet from the CPU 1201 to the server.

The non-transitory storage 1203 is configured to store data, including the local virtual port and relevant information of the associated vNIC, and perform the functions of the storage module in the device for forwarding the packet. The storage module is configured to store the local virtual port and relevant information of the associated vNIC.

It should be noted that, the device for forwarding a packet as shown in FIG. 12 is just an example for illustration. It is possible to implement using other structures different from the example of the present disclosure. For example, operations performed when executing the above-described instructions may also implemented by an Application Specific Integrated Circuit (ASIC). In addition, the above-described CPU may be one or more CPUs. If there are more CPUs, the above-described instructions are read and executed by the more CPUs jointly. Hence, the present disclosure does not limit the specific structure of the apparatus for forwarding a packet.

In a word, the examples of the present disclosure can achieve the following technical effects.

The physical switch obtains relevant information of a vNIC of each VM in the server, and associates the obtained relevant information with a local virtual port. Then, after receiving an Ethernet packet sent by the server, according to a source MAC address in the Ethernet packet and VLAN, the physical switch identifies the corresponding local virtual port and searches a corresponding VNI. At last, according to the searched VNI, the physical switch encapsulates the Ethernet packet as a VXLAN packet and forwards the VXLAN packet by mapping the VLAN data flow into the VXLAN. In the present disclosure, an overlay technology, e.g., VXLAN, is initiated in the physical switch, and the physical switch works as a VTEP. Because the physical switch uses hardware for forwarding, the forwarding efficiency is higher than the vSwitch implemented by software. Further, the VXLAN data flow is not only visible in the physical switch, but also operated between the physical switch and the server. In the service plane, only the VXLAN is visible for the user. By dividing a tenant according to the VXLAN, the VLAN is invisible for the user. VLAN works as a local service dividing tool, and a VLAN tag is automatically allocated by the system, so the VLAN is invisible for the final user.

The foregoing is preferred examples of the present disclosure, which is not intended to limit the present disclosure. Any modifications, equivalents, and improvements made within the spirit and principle of the present disclosure should be covered by the scope of the present disclosure.

What is claimed is:

1. A method for forwarding a packet in a data center network, the data center network comprises: at least one server, a virtual Switch (vSwitch) and a Virtual Machine (VM) configured in the server, a physical switch outside of the server and connected with the VM via the vSwitch, the method applied in the physical switch, comprising:

for each VM in the server, obtaining relevant information of a virtual Network Interface Controller (vNIC) of the VM, and associating the obtained relevant information with a local virtual port;

after receiving an Ethernet packet sent by the server, searching a Virtual eXtensible Local Area Network (VXLAN) Network Identifier (VNI) according to a source Media Access Control (MAC) address of the Ethernet packet and a Virtual Local Area Network (VLAN) Identifier (ID); and according to the searched VNI, encapsulating the Ethernet packet, obtaining a VXLAN packet, and forwarding the VXLAN packet.

2. The method according to claim 1, further comprising: after receiving a VXLAN packet, de-encapsulating the VXLAN packet, obtaining a VXLAN header and an Ethernet packet, and searching a local virtual port according to a destination MAC address in the Ethernet packet and a VNI in the VXLAN header obtained by de-encapsulation; and forwarding the Ethernet packet obtained by de-encapsulation to the server through a local physical port binded with the searched local virtual port.

3. The method according to claim 1, wherein obtaining relevant information of the vNIC of the VM comprises:

receiving a MAC address of the vNIC sent by the server; and obtaining a VNI of a VXLAN where the vNIC is located, and a VLAN ID of a VLAN associated with a VXLAN where the vNIC is located.

4. The method according to claim 3, wherein obtaining a VNI of a VXLAN where the vNIC is located comprises:

after receiving a vNIC type associated with the vNIC, obtaining a port strategy from a network management server according to the vNIC type, and obtaining a VNI from the port strategy as the VNI of the VXLAN where the vNIC is located, wherein the VNIC type associated with the vNIC is received after the VM manager specifies the associated VNIC type for the vNIC.

5. The method according to claim 4, wherein obtaining a VLAN ID of a VLAN associated with a VXLAN where the vNIC is located comprises:

determining, after obtaining a VNI of a VXLAN where the vNIC is located, whether a VXLAN according to the obtained VNI is available in the physical switch;

based on a determination that a VXLAN according to the obtained VNI is available in the physical switch, determine whether the VXLAN is associated with a VLAN; and based on a determination that the VXLAN is not associated with a VLAN, allocating a VLAN which is not associated with another VXLAN to the VXLAN according to the obtained VNI, and associating the VXLAN according to the obtained VNI with the allocated VLAN.

6. The method according to claim 5, further comprising: establishing a VXLAN in advance, and allocating a VNI for the VXLAN;

determining whether a VXLAN according to the obtained VNI is available; and based on a determination that the VXLAN is not available, returning a failure response to the server.

7. The method according to claim 4, wherein obtaining a VLAN ID of a VLAN associated with a VXLAN where the vNIC is located comprises:

determining, after obtaining a VNI of a VXLAN where the vNIC is located, whether a VXLAN according to the obtained VNI is available in the physical switch;

based on a determination that a VXLAN according to the obtained VNI is not available in the physical switch, establishing a VXLAN for the obtained VNI, allocating a VLAN which is not associated with any other VXLANs for the VXLAN, and associating the established VXLAN and the allocated VLAN.

8. The method according to claim 4, wherein a VNI of a VXLAN where the vNIC is located sent by the server is carried in a Group ID field of a Filter Info domain in a Virtual Station Interface (VSI) Discovery and configuration Protocol (VDP) packet.

9. The method according to claim 4, wherein obtaining a VLAN ID of a VLAN associated with a VXLAN where the vNIC is located comprises:

determining, after obtaining a VNI of a VXLAN where the vNIC is located, whether a VXLAN according to the obtained VNI is available in the physical switch;

based on a determination that a VXLAN according to the obtained VNI is available in the physical switch, determine whether the VXLAN is associated with a VLAN; and based on a determination that the VXLAN is associated with a VLAN, searching the VLAN.

10. The method according to claim 4, wherein obtaining a VLAN ID of a VLAN associated with a VXLAN where the vNIC is located comprises:

after receiving a vNIC type associated with the vNIC sent by the server, obtaining a port strategy from the network management server according to the vNIC type, and obtaining a VLAN ID from the port strategy as a VLAN ID of a VLAN associated with a VXLAN where the vNIC is located.

11. An apparatus for forwarding a packet in a data center network, the data center network comprises: at least one server, a virtual Switch (vSwitch) and a Virtual Machine (VM) configured in the server, a physical switch outside of the server and connected with the VM via the vSwitch, the apparatus applied in the physical switch, comprising:

a processing module, to, for each VM in the server of the physical switch, obtain relevant information of a virtual Network Interface Controller (vNIC) of the VM, and associate the obtained relevant information with a local virtual port;

a receiving module, to receive an Ethernet packet sent by the server;

a searching module, to, after receiving an Ethernet packet from the server in the receiving module, search a Virtual eXtensible Local Area Network (VXLAN) Network Identifier (VNI) according to a source Media Access Control (MAC) address in the Ethernet packet and a Virtual Local Area Network (VLAN) Identifier (ID);

an encapsulation and de-encapsulation module, to, according to the VNI searched in the searching module, encapsulate the Ethernet packet received in the receiving module and obtain a VXLAN packet; and a forwarding module, to forward the VXLAN packet encapsulated in the encapsulation and de-encapsulation module.

12. The apparatus according to claim 11, wherein the receiving module, is further to receive a VXLAN packet;

the encapsulation and de-encapsulation module, is further to, after receiving a VXLAN packet in the receiving module, de-encapsulate the VXLAN packet, and obtain a VXLAN header and an Ethernet packet;

the searching module, is further to search a local virtual port according to a destination MAC address in the Ethernet packet and a VNI in the VXLAN header de-encapsulated in the encapsulation and de-encapsulation module; and the forwarding module, is further to forward the Ethernet packet de-encapsulated in the encapsulation and de-encapsulation module to the server through a local physical port binded with the local virtual port searched in the searching module.

13. The apparatus according to claim 11, wherein the processing module comprises:

a MAC receiving unit, to receive a MAC address of the vNIC sent by the server;

a first obtaining unit, to obtain a VNI of the VXLAN where the vNIC is located; and a second obtaining unit, to obtain a VLAN ID of a VLAN associated with the VXLAN where the vNIC is located.

14. The apparatus according to claim 13, wherein the first obtaining unit is further to:

receive a VNI of a VXLAN where the vNIC is located sent by the server, wherein the VNI is sent to the server after a VM manager specifies the VXLAN where the vNIC is located for the vNIC;

or, after receiving a vNIC type associated with the vNIC sent by the server, obtain a port strategy from a network management server according to the vNIC type, and obtain a VNI from the port strategy as the VNI of the VXLAN where the vNIC is located, wherein the VNIC type associated with the vNIC is sent to the server after the VM manager specifies the associated VNIC type for the vNIC.

15. The apparatus according to claim 14, wherein the second obtaining unit is further to:

after a VNI of a VXLAN where the vNIC is located is obtained in the first obtaining unit, search whether there is a VXLAN available in the physical switch according to the obtained VNI; if yes, when the searched VXLAN is not associated with a VLAN, allocate a VLAN which is not associated with any other VXLANs for the searched VXLAN, and associate the searched VXLAN with the allocated VLAN; when the searched VXLAN is already associated with a VLAN, search the VLAN associated with the searched VXLAN;

or, after receiving a vNIC type associated with the vNIC sent by the server, obtain a port strategy from the network management server according to the vNIC type, and obtain a VLAN ID from the port strategy as a VLAN ID of a VLAN associated with a VXLAN where the vNIC is located.

16. The apparatus according to claim 15, the apparatus further comprises:

an establishing module, to establish a VXLAN in advance, and allocate a VNI for the VXLAN;

wherein the second obtaining unit is further to, after searching whether there is a VXLAN available according to the obtained VNI, if it is no, end the procedure.

17. The apparatus according to claim 15, wherein the second obtaining unit is further to:

after searching whether there is a VXLAN available according to the obtained VNI, if it is no, establish a VXLAN identified by the obtained VNI, allocate a VLAN which is not associated with any other VXLANs for the VXLAN, and associate the VXLAN and the VLAN.

* * * * *